United States Patent
Slavov et al.

(10) Patent No.: US 9,549,321 B2
(45) Date of Patent: Jan. 17, 2017

(54) REMOTE PROVISIONING OF 3GPP DOWNLOADABLE SUBSCRIBER IDENTITY MODULE FOR VIRTUAL MACHINE APPLICATIONS

(75) Inventors: Kristian Slavov, Espoo (FI); Patrik Salmela, Kirkkonummi (FI); Jukka Ylitalo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 220 days.

(21) Appl. No.: 14/369,538

(22) PCT Filed: Dec. 29, 2011

(86) PCT No.: PCT/EP2011/074263
§ 371 (c)(1),
(2), (4) Date: Jun. 27, 2014

(87) PCT Pub. No.: WO2013/097902
PCT Pub. Date: Jul. 4, 2013

(65) Prior Publication Data
US 2014/0337940 A1    Nov. 13, 2014

(51) Int. Cl.
*G06F 9/455* (2006.01)
*H04W 12/06* (2009.01)
(Continued)

(52) U.S. Cl.
CPC .......... *H04W 12/06* (2013.01); *G06F 9/45533* (2013.01); *H04W 4/005* (2013.01);
(Continued)

(58) Field of Classification Search
USPC .......................................................... 726/5
See application file for complete search history.

(56) References Cited

U.S. PATENT DOCUMENTS

2010/0311468 A1* 12/2010 Shi ........................ H04W 4/003
455/558
2011/0265158 A1* 10/2011 Cha ..................... H04L 63/0823
726/6

(Continued)

OTHER PUBLICATIONS

Xen and the Art of Virtualization Paul Barham* , Boris Dragovic, Keir Fraser, Steven Hand, Tim Harris, Alex Ho, Rolf Neugebauer†, Ian Pratt, Andrew Warfield Proceedings of the nineteenth ACM symposium on Operating systems principles pp. 164-177 © 2003.*

(Continued)

*Primary Examiner* — Kambiz Zand
*Assistant Examiner* — Benjamin Kaplan
(74) *Attorney, Agent, or Firm* — Murphy, Bilak & Homiller, PLLC

(57) ABSTRACT

A method is presented of providing a subscriber identity for the provision of services on behalf of the subscriber in a virtual computing environment. The method includes receiving a request to establish an execution environment for a virtual machine-to-machine equipment, vM2 M E. The vM2ME is provided, comprising software for execution in the virtual computing environment and a downloadable Subscriber Identity Module. A Communications Module, CM, is set up for execution in a domain of a virtualization platform. The CM provides an end-point for communications between the vM2ME and a 3GPP network. The Subscriber Identity Module is installed for execution together with the CM, the Subscriber Identity Module including a 3GPP identity of the subscriber, security data and functions for enabling access to the vM2ME via the 3GPP network.

17 Claims, 11 Drawing Sheets

(51) Int. Cl.
  *H04W 8/26* (2009.01)
  *H04W 60/00* (2009.01)
  *H04W 4/00* (2009.01)
  *H04W 28/16* (2009.01)

(52) U.S. Cl.
  CPC ............ *H04W 8/26* (2013.01); *H04W 28/16* (2013.01); *H04W 60/00* (2013.01)

(56) References Cited

OTHER PUBLICATIONS

3GPP, "3rd Generation Partnership Project; Technical Specification Group Services and System Aspects; Feasibility study on the security aspects of remote provisioning and change of subscription for Machine to Machine (M2M) equipment (Release 9)", 3GPP TR 33.812 V9.2.0, Jun. 2010, 1-87.

Barriga, et al., "M2M Remote-Subscription Management", Enabling M2M Mobile Connectivity. Ericsson Review. XP-002686983, May 2, 2011, 1-6.

Glitho, "Application Architectures for Machine to Machine Communications: Research Agenda vs. State-of-the Art", Proceedings of the 6th International Conference on Broadband & Biomedical Application, Nov. 21-24, 2011, Melbourne, Australia, 1-5.

\* cited by examiner

# REMOTE PROVISIONING OF 3GPP DOWNLOADABLE SUBSCRIBER IDENTITY MODULE FOR VIRTUAL MACHINE APPLICATIONS

FIELD OF THE INVENTION

The invention relates to the remote provisioning of a Machine Communication Identity Module, (MCIM) for the management of virtual machines in a virtualised computing environment and so enabling 3GPP communications with a virtual machine.

BACKGROUND

A virtual machine (VM) is a software implementation of a computer that executes programs in the same way as a physical machine, and is hosted (i.e. as a guest) by physical computing equipment that may be unseen by and unknown to the user or provider of the programs running in the VM. Cloud computing is a concept that provides for the delivery of computer services including computation resources, software, data access, and storage services without requiring end-user knowledge of the physical location and configuration of the computing machines that deliver the services. The services are provided to computers and other devices over a network such as the Internet. From the user's viewpoint, the services can be considered as being provided by one or more virtual machines (VMs).

Cloud Computing provides an abstraction of a potentially unlimited amount of networking, computing and storage resources for clients. The abstraction may be achieved by virtualization of the infrastructure, platform and software in data centers. There are many solutions available for providing the virtualization platform for virtual machines, for example Xen. In these systems multiple virtual machines can be run on one physical machine. The abstraction of unlimited and dynamically allocated resources may be referred to as a cloud platform or just a cloud. The virtual machines are run in isolated run-time environments, or domains (in Xen terminology, domUs) while the control mechanism of the virtualization platform runs in a specific run-time environment, or management domain (in Xen terminology, dom0). Note that, in general, cloud computing does not necessarily imply the use of virtual machines, or a virtualization platform. However, for the purposes of the current disclosure it should be assumed that references to a cloud or to cloud computing do imply a virtualized computing environment unless indicated otherwise.

For the purposes of this discussion, the term "user" is intended to refer to any entity (individual, company, organisation, etc.) that operates or uses equipment, such as a mobile telephone or other mobile device, or a pc, laptop or other computing device, that is enabled to access a 3G or 4G network (including machine-to-machine, M2M, devices). A "subscriber" is an entity that has entered an agreement with a mobile network operator (MNO) for the provision of services—more particularly (unless stated otherwise) a subscriber, or M2M subscriber, referred to below is an entity that has entered an agreement for the provision of services provided from a VM. The "owner" of a VM is the entity that provides the VM software, and which may or may not be the same as the subscriber.

At the infrastructure level, the virtualization is implemented by means of a Virtual Machine Manager (VMM), otherwise referred to as a hypervisor. A hypervisor employs hardware virtualization techniques that allow multiple operating systems, termed guests, to run concurrently on a host computer.

Mobile telecommunications network operators (MNOs) at present do not have an established way to manage the provisioning of cloud computing resources to subscribers, and how to make use of the 3G and 4G technologies and standards defined by the $3^{rd}$ Generation Partnership Project (3GPP) such as the Evolved Packet System (EPS) networks, and those that relate to the Systems Architecture Evolution (SAE) and Long-Term Evolution (LTE). These are referred to hereafter as 3GPP networks.

3GPP subscriber credentials are stored on Universal Integrated Circuit Cards (UICCs or Subscriber Identification Module, SIM, cards) and are used for identifying the subscriber whose card is in a 3GPP device and for establishing and securing communication between the device and the 3GPP network. The installed infrastructure for 3GPP subscriber management and the standardized technology used for it are key resources of the 3GPP operators. Increasingly, the operators are becoming bit-pipe providers for third party services, which does not provide a business model that has a high added-value potential. Instead, the operators would prefer to be involved providing services. The installed identity management system is one thing that can be used for providing new services in the form of Identity and Access Management (IAM) and security for various services. Cloud computing does require federated identity management for the virtual machines (VMs) and thus presents an opportunity for the network operators.

The key resources of the operators are the customer base (i.e. the potential subscribers) and the identity management for the subscribers, as well as the installed infrastructure. The business is based on standardized 3GPP mechanisms for charging, Quality of Service (QoS), security, roaming, interoperability, and Service Level Agreements (SLAs) etc. However, similar kinds of standards have not been established for cloud computing technologies. This makes it difficult for operators to integrate their key resources with cloud platforms in order to benefit from the cloud-computing paradigm and enter into new business fields. In summary, the problem is how to enable operators to benefit from their existing key resources with cloud computing. This can be broken down in to three key areas:

How to utilize operators' existing EPS (e.g. 3GPP/Long Term Evolution (LTE)) infrastructures in a cloud computing environment;

How to seamlessly integrate virtualized services running in a data-center with an EPS (e.g. 3GPP/LTE) infrastructure;

How to bind virtual machines running in a cloud with an EPS (e.g. 3GPP/LTE) network in a secure way.

It is currently proposed to make use of the 3GPP Machine Communication Identity Module (MCIM) concept for managing VMs (providing identities, security etc.). MCIM is a recent concept studied by the 3GPP (see 3GPP TR 33.812, version 9.2.0, 22.06.2010), "Feasibility study on the security aspects of remote provisioning and change of subscription for Machine-to-Machine (M2M) equipment"). The concept, which is targeted at M2M communication scenarios, replaces the UICC card with a software based Universal Subscriber Identification Module (USIM) that can be downloaded into the device. The object is to provide a mechanism by which devices can download their network credentials from the device's selected home operator (SHO)—i.e. the operator with whom the owner of the device has established a service agreement. The current scope of MCIM is for use with sensor-like devices that the owner usually does not have physical access to and needs to manage remotely.

The commonly agreed operating procedure is currently:
1. The owner of the device enters a service agreement with a mobile network operator (MNO), to be referred to hereafter as the Selected Home Operator (SHO) and registers his/her device.
2. The Discovery and Registration Function (DRF) handling the mobile device (i.e. providing preliminary credentials to the device) is informed of the SHO of the device and stores this mapping.
3. The mobile device is powered on and scans for available mobile networks to try to connect to a 3GPP Network Initial Connectivity Function (ICF). The preliminary credentials stored in the Machine to Machine Equipment (M2ME) are used for connecting to the network and they point to the DRF of the current home network (operated by the SHO) of the device.
4. The DRF informs the M2ME about the SHO registered to it and redirects the device to the SHO/MCIM Download and Provisioning Function (DPF) operated by the SHO.
5. Next, the mobile device connects to the SHO/DRF, and downloads the proper credentials that enable the device to start using the SHO subscription as per the service agreement between the owner of the device and the mobile network operator.

For the purposes of the present discussion, the term "MCIM" should be understood as referring to any downloadable Subscriber Identity Modules (SIMs), not only to sensor-like devices or other M2M devices as known today, and not limited to the MCIM that is specified in 3GPP TR 33.812 referenced above. The present disclosure is concerned with how the MCIM credentials of a client who is a subscriber to the 3GPP network can be provided to enable services to be provided from a VM on behalf of the subscriber/client. This provisioning of the MCIMs to the VMs focuses on the bootstrapping of the VMs together with the associated MCIM(s). For the purposes of the present disclosure, the subscriber is an entity (individual, group, company or other organization) that has entered into an agreement with the SHO for the provision of computer-based applications or services on the subscriber's behalf. These applications/services are provided over the SHO's 3GPP network from one or more VMs in a virtualized computing environment. For example, the subscriber might be a company that is selling a computer-based service to its customers over the internet; as another example, the subscriber might be an organization whose member or employees are the operators of a computer based data/processing system that makes use of applications or services that are to be provided by the SHO from one or more VMs operating in a virtualized computing environment; as another example, the subscriber could be a private individual using a computer-based service for private use.

Note also that the term MNO indicates the network operator of the network to which the device is connected. This may be the SHO, or it might be another network operated by a Visited Network Operator (VNO) which then communicates with the SHO. For the purposes of this discussion it matters not which is the case, as the important functions involve the SHO.

SUMMARY

In general, the proposed solutions for VM management consist of utilizing the MCIM for providing 3GPP identities and credentials, which can then be used for identifying the VM and for providing security and QoS to the VM. The MCIM is downloaded for the VM and run together with a Communications Module (CM), which utilizes the data found in the MCIM for performing 3GPP communication towards the 3GPP network. Together the MCIM and CM are analogous to a 3GPP modem for the VM. Note that references herein to a 3GPP network should be assumed to relate to any Evolved Packet System (EPS) networks (unless indicated otherwise).

The problem addressed in this document is how to implement MCIM provisioning in a virtualized computing environment that is operated by, or from, an MNO. Whereas the MCIM concept discussed in 3GPP TR 33.812 referenced above deals with radio network access for a M2M device, this document addresses cases where the M2M device is actually a virtual M2M device, and connectivity is via the Internet. In the virtualized environment discussed here, a platform is provided for securely running virtual M2M equipment (vM2ME) that may comprise several virtual M2M devices on a single physical device, such that each of them appear (to the network) as independent M2M devices.

The vM2ME includes the VM software together with an associated MCIM. The VM software may be a bundle of software provided by the subscriber that includes executable files and/or configuration files and/or other content. As one example, the bundle of software provided by the subscriber might include a web server together with all its configuration files and content; as another example, the MNO might already provide a web server, and the subscriber provides a bundle that includes configuration files and the content.

A first aspect is a method of providing a subscriber identity for the provision of services on behalf of the subscriber in a virtual computing environment. The method includes receiving a request to establish an execution environment for a virtual machine-to-machine equipment, vM2ME. The vM2ME is provided, comprising software for execution in the virtual computing environment and a Machine Communication Identity Module, MCIM. A Communications Module, CM, is set up for execution in a domain of a virtualisation platform. The CM provides an end-point for communications between the vM2ME and a 3GPP network. The MCIM is installed for execution together with the CM, the MCIM including a 3GPP identity of the subscriber, security data and functions for enabling access to the vM2ME via the 3GPP network.

A second aspect is a 3GPP network entity configured to provide a subscriber identity for the provision of services on behalf of the subscriber in a virtual computing environment. The network entity is configured, on receiving a request to establish an execution environment for virtual machine-to-machine equipment, vM2ME, to provide the vM2ME that comprises a virtual machine, VM, software for execution in the virtual computing environment and a Machine Communication Identity Module, MCIM. The network entity is configured to set up a Communications Module, CM, for execution in a virtualisation platform, the CM providing an end-point for 3GPP communications to/from the VM. The network entity is configured to install the MCIM for execution together with the CM, the MCIM including a 3GPP identity of the subscriber, security data and functions for enabling access to the vM2ME via the 3GPP network.

A third aspect is a computer program for programming a computer in a network to provide a subscriber identity for the provision of services from a virtual computing environment. On receiving a request to establish an execution environment for a virtual machine-to-machine equipment, vM2ME, the program causes the computer to provide the vM2ME comprising software for execution in the virtual computing environment and a Machine Communication Identity Module, MCIM. The program causes the computer to set up a Communications Module, CM, for execution in a domain of a virtualisation platform, the CM providing an end-point for communications between the vM2ME and a 3GPP network. The program causes the computer to install the MCIM for execution together with the CM, the MCIM including a 3GPP identity of the subscriber, security data and functions for enabling access to the vM2ME via the 3GPP network.

A fourth aspect is a computer program product comprising instructions in accordance with the computer program of the third aspect.

BRIEF DESCRIPTION OF THE DRAWINGS

FIG. 3b is a signal diagram illustrating an alternative procedure for provisioning an MCIM for the first embodiment according to FIG. 3a.

FIG. 9 a signal diagram illustrating the procedure for provisioning an MCIM for Alternative A of the third embodiment according to FIG. 8a.

DETAILED DESCRIPTION

Figure 10:
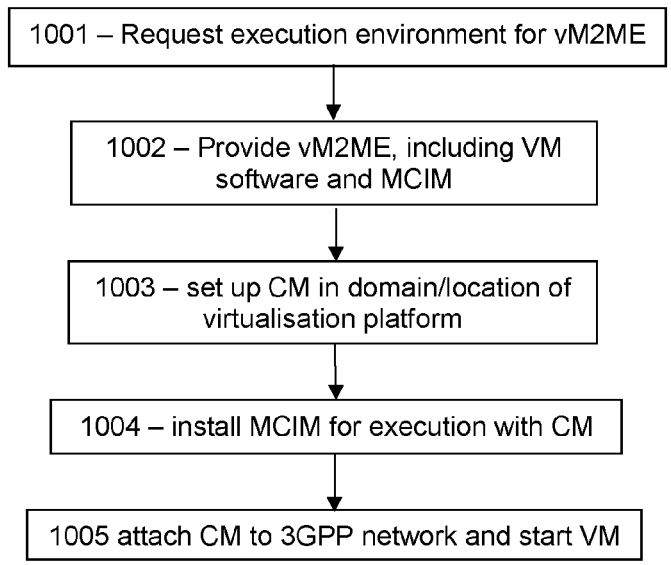
FIG. 10 is a flow diagram illustrating the main steps in a method of provisioning a 3GPP MCIM for a vM2ME in accordance with the embodiments described herein.

FIG. 10 provides an overview of the steps involved in a method of providing a subscriber identity for the provision of services on behalf of the subscriber in a virtual computing environment. At step 1001 a request to establish an execution environment for a vM2ME is received. The request may be received from a requester (not shown) that may be user equipment (UE) operated by a subscriber to a service offered by a MNO, or from some other agent or intermediary authorised to do so on the subscriber's behalf, as long as the request includes the identity of the subscriber. The request is received by the Selected Home Operator (SHO), who in some embodiments is also the operator of a virtualised environment (cloud). At step 1002 the vM2ME is provided. Normally the requester will provide the VM, or a link or other indication of where the VM can be found, to the SHO. The vM2ME, which includes the VM plus the MCIM, is then provided to the virtualised environment by the SHO. The vM2ME includes the VM software, or bundle of software provided by the subscriber that is to be run in the virtual computing environment and a Machine Communication Identity Module, MCIM. At step 1003 a Communications Module, CM, is set up for execution in a domain of a virtualisation platform. The CM provides an end-point for communications between the vM2ME and the SHO's 3GPP network. At step 1004 the MCIM is installed for execution together with the CM. As the MCIM includes the 3GPP identity of the subscriber, as well as the security data and functions for enabling access to the vM2ME via the 3GPP network, then, as shown at step 1005 the CM can attach to the SHO's network and the VM software can be started.

Figure 11:
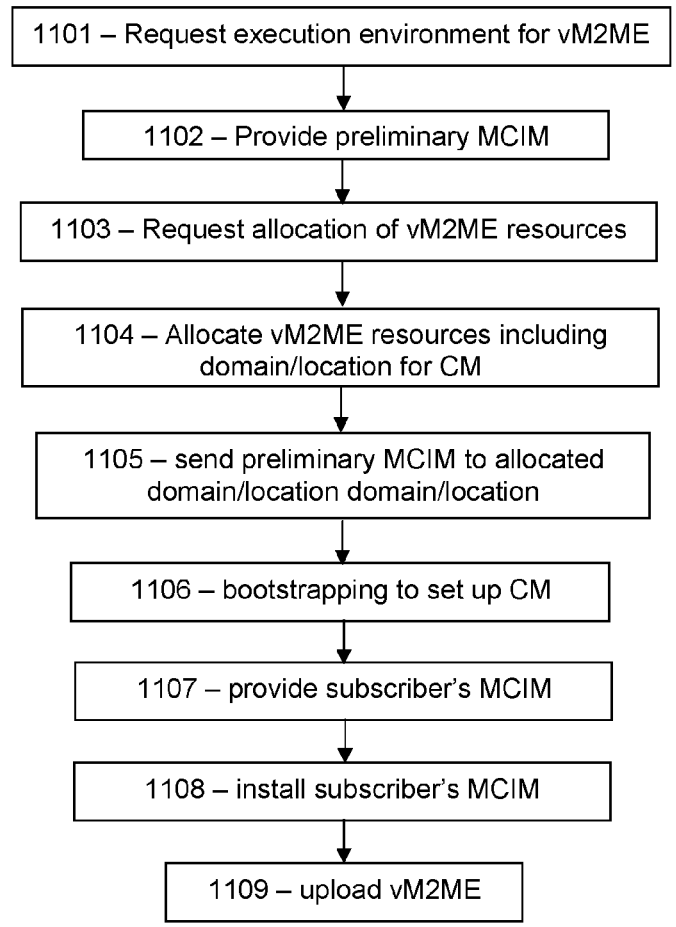
FIG. 11 is a flow diagram illustrating additional steps in the method of FIG. 10 in accordance with some of the embodiments described herein.

FIG. 11 illustrates some additional steps that are performed in accordance with some of the embodiments described below. At step 1101, as in the method of FIG. 10 described above, a request to establish an execution environment for a vM2ME is received. At step 1102 a preliminary Machine Communication Identity Module (MCIM) is provided. The purpose of the preliminary MCIM is to provide sufficient data on identities and security to enable a bootstrapping procedure to be performed. This might also include information on the location of the DRF in case that cannot be inferred from other information in the request 1101. At step 1103 a request is sent from the SHO to a management domain of the virtualisation platform for allocation of resources for the vM2ME. These are allocated at step 1104, including a domain/location where the communication module (CM) will be installed. At step 1105, in response to a confirmation of allocation of the resources, the preliminary MCIM is provided to the domain/location of the virtualisation platform that has been allocated for the vM2ME.

At step 1106, a bootstrapping procedure is performed, based on information provided in the preliminary MCIM, to set up a CM for execution in the allocated domain/location of the virtualisation platform. The CM will provide an end-point for 3GPP communications between the VM and the SHO's 3GPP network on behalf of the subscriber. After successfully completing the bootstrapping procedure, at step 1107 a subscriber's MCIM is provided to the allocated domain/location. The subscriber's MCIM includes a 3GPP identity of the subscriber, security data and functions for enabling access to the VM via the 3GPP network. At step 1108 the subscriber's MCIM is installed for execution together with the CM. The VM software may have already been installed, in which case the procedure can continue as at step 1005 of FIG. 10.

For example, in some embodiments, the VM may be operated by the MNO, which in some cases is the SHO to run applications or provide services on behalf of the subscriber. Otherwise, at step 1109, the VM software is uploaded to the allocated domain/location where the VM is installed before commencing its operation, as at step 1005 of FIG. 10.

Although not shown in FIG. 10 or 11, the provision of the preliminary MCIM and of the subscriber's MCIM may include obtaining authorisations from a registration function (e.g. Discovery and Registration Function—DRF) and a provisioning function (e.g. Download and Provisioning Function—DPF). This is done to authenticate the preliminary MCIM and to authorise the provision of the subscriber's MCIM.

Each of the embodiments described in detail below relates to a different deployment scenario of the MCIM and CM. In all cases, for each VM at least one MCIM is downloaded and associated with a CM. The storing, handling and running of these can vary in each of the different embodiments. Essentially: in the first embodiment the MCIM and CM are located in the management domain (Dom0) such that they will be executed by the CPUs under the control of the operating system of the management domain (Dom0); in the second embodiment the MCIM and CM are located in an operator's virtual machine (DomU); in the third embodiment the MCIM and CM are located on a physical network interface card (pNIC). Note that in the case of the second embodiment there is a further alternative that is described below, in which the MNO's VM itself runs applications/services on behalf of the subscriber (in other words there is not a separate VM running the subscriber's applications/services as in the other embodiments).

Together the MCIM and CM form the 3GPP communication endpoint and act as a modem for the VM. The access networks and protocols used for connecting the MCIM and CM to the 3GPP network can be either a 3GPP access or a non-3GPP access, of which the latter is currently more prevalent. The non-3GPP access can be either trusted or untrusted. The communication over the access networks operates as described in the 3GPP specifications. The MCIM and CM can also perform Network Address Translation (NAT) functionality if it is desirable that the VM maintains the same IP address when migrated. Alternatively the communication between the MCIM/CM and VM could be pure L2 communication (i.e. layer 2, data link layer, as defined in the Open Systems Interconnection, OSI, model) with the IP being taken care of by the MCIM/CM.

With the embodiments discussed below, all traffic to/from the VM (e.g. with a peer in the Internet) is routed via the network of the 3GPP operator that provides the MCIM.

This could result in less than optimized routing if the VM is located in somewhere other than in the 3GPP operator's network. In that case it is possible to utilize local breakout to provide direct access to the Internet from the VM (MCIM/CM). In the 3GPP MCIM study that resulted in 3GPP TR 33.812 (referenced above) it was assumed that a manufacturer could build into a device a preliminary MCIM that would operate anywhere in the world, for bootstrapping purposes. The present discussion, which is concerned with a virtual environment and not with running physical devices, it is assumed that the MCIM is provided by the SHO as this is the most secure option. It is possible that the MCIM could be provided by some third party (or that the operator acquires it from the third party), in which case there might be further security issues to be addressed, but these are not discussed here.

The VMM or hypervisor in the virtualization environment ensures that the different resources of the VMs are isolated from each other. The isolation of MCIMs from VMs depends on how and where the MCIM and CM are run (as described in the alternative embodiments).

Each of the embodiments presented could also be achieved by using the alternative of a physical UICC instead of the MCIM located in the host hosting the VM. However, such alternatives have limitations, for example with mobility (i.e. the ability to move the subscriber's VM).

First Embodiment

MCIM and CM are Located in a Management Domain (Dom0)

The description of this embodiment uses the expression Virtual Machine-to-Machine Equipment (vM2ME), which is a bundle of one or more VMs associated with an MCIM. Essentially the term vM2ME means that the subscriber provides the VM image (software) to the operator. The VM is associated with the MCIM (obtained from the mobile network operator). Two alternatives, A and B are described. In A, the MNO is also the operator of the cloud or virtualised computing environment. In B the operator enables the VM to be run in a third party's cloud. Note that the VM image (software) is created by the subscriber and is therefore untrustworthy from the MNO's viewpoint.

In this embodiment, there are some definitions of terms that differ from the original ones used in 3GPP TR 33.812. These are as follows.

MCIM: in 3GPP TR 33.812, MCIM is "a term that indicates the collection of M2M security data and functions for a M2ME for accessing a 3GPP network". In this embodiment MCIM resides on a Trusted Environment (TRE), or on a UICC, but otherwise all the main principles of MCIM described in 3GPP TR 33.812 still apply.

Trusted Environment (TRE): within a virtualization platform, the TRE provides a trusted run-time environment for the hypervisor and management domain (Dom0) using a Trusted Platform Module (TPM) and secure boot-loader. The TRE can be validated at any time by an external agency that is authorized to do so. For example, the external agency may use TPM-based remote attestation to verify the secure boot-process for the hypervisor and management domain (Dom0). The TRE provides hardware and software protection and separation for the provisioning, storage, execution and management of the VM(s).

Communications Module (CM): The communication endpoint that interacts with the MNO's 3GPP network, and sets up any necessary tunneling for the VM, such as IPsec with an Evolved Packet Data Gateway, ePDG or General Packet Radio System (GPRS) Tunneling Protocol, GTP, ". As a result, the traffic between the 3GPP network and the VM is authenticated by the MCIM.

Machine to Machine Equipment Platform (M2MEP) binds the TRE and CM together, thereby fulfilling the requirements for running the vM2ME. A M2MEP is required for running vM2ME. The MCIM object and related VMs are deployed together on the M2MEP.

Subscriber: the entity who is identified on the MCIM, is associated with a vM2ME and has a contractual relationship with the MNO to provide services to the vM2ME. The MNO can be the operator of the data-centre (M2MEP) where the vM2MEs are running.

Alternative A: MNO provides services in its own cloud.

Figure 1A:
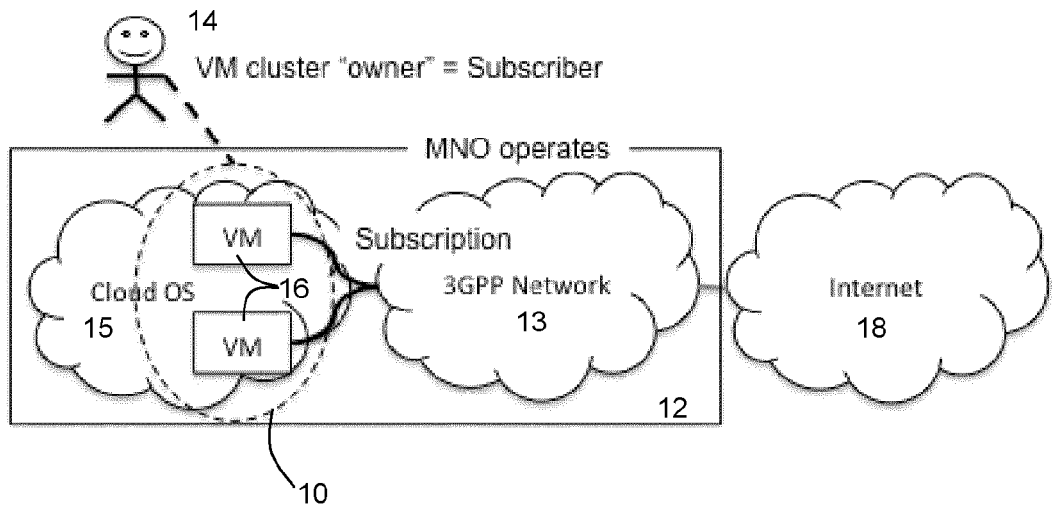
FIG. 1a is a schematic illustration showing how a vM2ME relates to the parties involved in the service level agreements in accordance with a first embodiment.

The following describes how vM2MEs can be remotely provisioned in a MNO's data-centre utilizing MCIM technology (as described in 3GPP TR 33.812). Each vM2ME contains a 3GPP subscription (or many subscriptions). FIG. 1a illustrates schematically how a vM2ME 10 relates to the parties involved in the service level agreements—i.e. the MNO 12 and the subscriber 14. The MNO 12 is both the operator of the 3GPP network 13 and of the data center or cloud OS 15. The subscriber 14 is the owner of VMs 16 (here two VMs are shown, but there could be any number), that provide services to users (not shown) accessing the VMs 16 over the Internet 18. Also the MNO 12 may provide the virtualization platform for more than one subscriber by having more than one MCIM installed, each serving a different subscriber.

At the infrastructure level, virtualization is implemented by means of a Virtual Machine Manager (VMM), otherwise referred to as a hypervisor. A VMM employs hardware virtualization techniques that allow multiple operating systems, termed guests, to run concurrently on a host computer. Xen is a well-known and widely used example of a hypervisor (see "What is Xen Hypervisor?" http://xen.org/files/Marketing/WhatisXen.pdf, as archived on web.archive.org on 22.07.2011). Xen systems are typical of many VMM systems that can be described in a conceptual layered structure, as depicted schematically for the vM2ME of this first embodiment in FIG. 1b, with the VMM (hypervisor) 101 as the lowest and most privileged layer residing on the hardware 102. In the layer above this are guest operating systems 104, 106, which the hypervisor 101 schedules across the physical CPUs of the computer machines in the data centre. The first guest operating system 104 is the operating system of a virtual management domain (called in Xen terminology domain 0, or dom0), which boots automatically when the VMM 101 boots and receives special management privileges as well as direct access to all physical hardware. The system administrator can log in to the management domain 104 in order to manage the other guest operating systems such as system 106, (called a domain U or domU in Xen terminology) in which the VMs are executed.

Figure 1B:
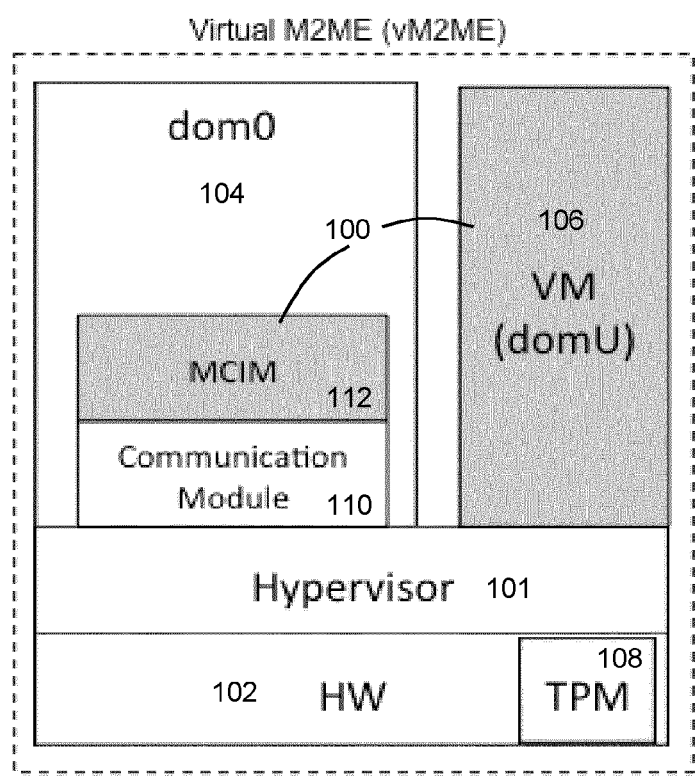
FIG. 1b shows a conceptual layered structure of a first embodiment with a virtualisation platform on which is installed a vM2ME.

In the structure shown in FIG. 1b a vM2ME 100 is based on a TRE, which is defined around the management domain 104 and the VMM (hypervisor) 101 residing on hardware 102, by installation of a Trusted Platform Module (TPM) 108 together with a secure boot-loader (not shown). The TRE is validated by an external agency, which in the example described below is a Platform Validation Authority (PVA). Also shown in FIG. 1b are a CM 110 and associated MCIM 112, both of which are installed for execution in the management domain (dom0) 104, and a VM 106 in a guest operating system domain (domU).

Figure 2:
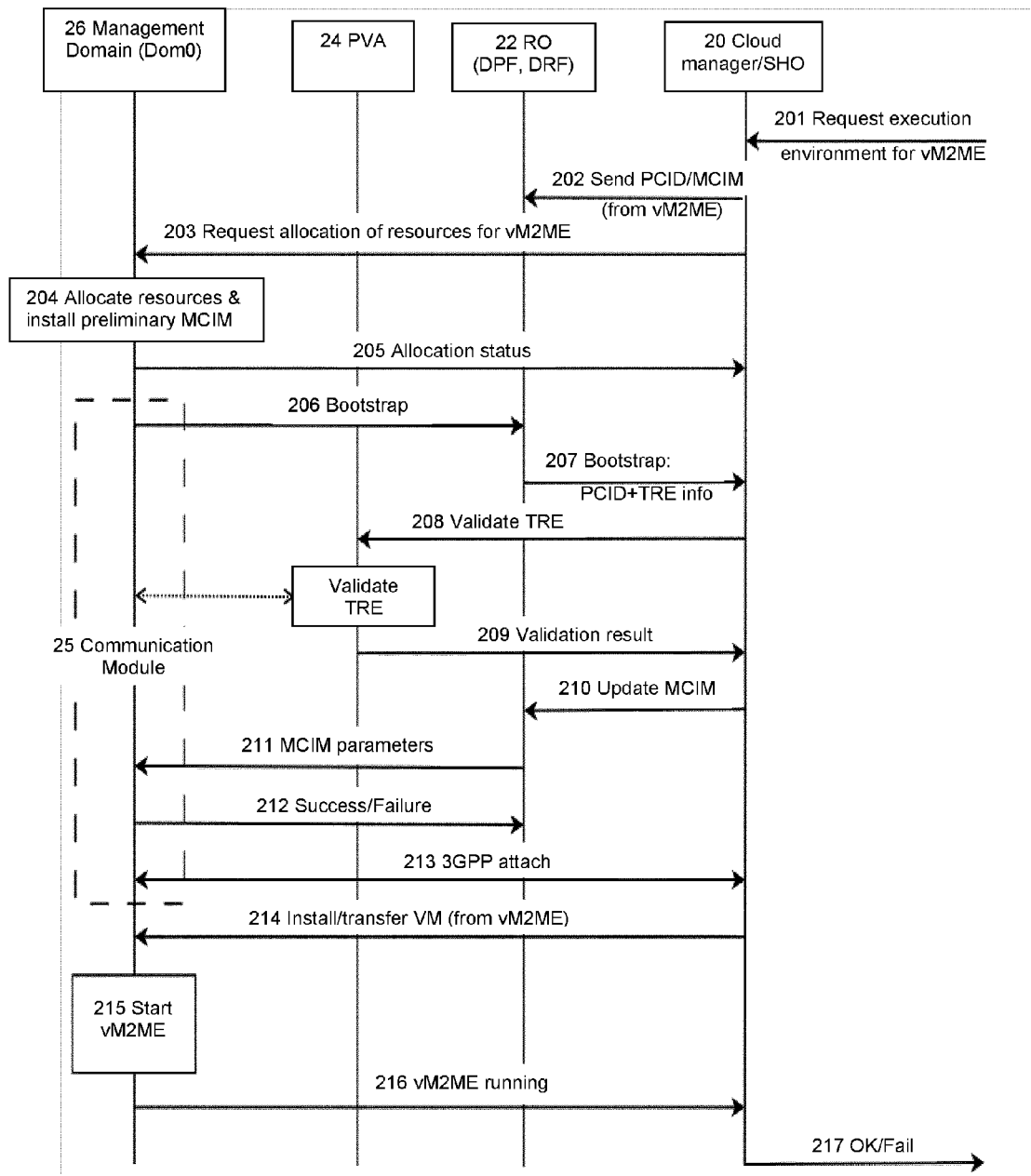
FIG. 2 is a signal diagram illustrating the procedure for provisioning an MCIM for the first embodiment according to FIGS. 1a and 1b.

FIG. 2 is a signal diagram illustrating the procedure for provisioning the MCIM, and thereby enabling the vM2ME to start running on behalf of the subscriber. The entities involved include: the Cloud Manager/SHO 20, as in this case the Cloud Manager is the same as the MNO that is also the SHO of the subscriber; a Registration Operator (RO) 22, that takes care of the registration function, which includes contacting a DRF and a DPF for the purposes of completing the registration and obtaining the necessary authorizations; a Platform Validation Authority (PVA) 24; and the management domain (Dom0) 26 of the virtualization platform. The procedure is as follows.

The cloud manager/SHO 20 receives a request 201 to establish an execution environment for a vM2ME. The Cloud Manager/SHO 20 allocates a preliminary MCIM for the subscriber. The preliminary MCIM is identified by a preliminary connectivity identifier (PCID), which, for example, could be an International Mobile Subscriber Identifier (IMSI) number. The Cloud Manager/SHO 20 sends the PCID and/or the MCIM to the RO 22 and registers the preliminary MCIM by storing a mapping between the PCID, which it obtains from the preliminary MCIM, and the DPF. Alternatively, the preliminary MCIM might be pre-provisioned, in which case the Cloud Manager/SHO 20 simply retrieves the PCID from the preliminary MCIM and stores the mapping. Note that the preliminary MCIM contains only sufficient information to enable a bootstrapping operation of a Communication Module (CM). The Cloud Manager/SHO 20 sends a request 203 to the management domain (Dom0) 26 for resources for a new VM to be provided, and also provides the preliminary MCIM to the management domain 26. The management domain 26 then allocates the required resources and installs the preliminary credentials contained in the preliminary MCIM, at step 204. The management domain 26 also installs a new instance of the CM software module 25 associated with the new preliminary MCIM, and then returns an allocation status message 205 to the Cloud Manager/SHO 20.

The CM 25 allocated for the VM at step 204, starts the bootstrapping process (similar to what is described in 3GPP TR 33.812) and connects 206 to the DRF (via RO 22). The DRF forwards the request to the DPF (based on the registration done at the outset). Before the DPF can authorize provisioning of the subscriber's full MCIM it needs to check that the TRE of the M2MEP is in a valid state. To do this the DPF sends the PCID and TRE information in signal 207 to the SHO 20. The SHO 20 then sends a request 208 for validation to the PVA 24. The PVA 24 validates the TRE of the M2MEP and returns a validation result 209. Assuming that the result 209 is a positive validation, the Cloud Manager/SHO 20 can now provision the subscriber's MCIM, which it provides (signal 210 via RO 22) to the DPF. The RO/DPF 22 then sends the subscriber's MCIM parameters (signal 211) to the CM 25 running in management domain 26 for installation therein.

After the subscriber's MCIM has been installed in the CM 25 it sends a status signal 212 indicating success (or failure) of the installation to the DPF via RO 22. The CM 25 with newly provisioned MCIM then performs network attachment 213 (e.g. 3GPP attach procedure over IP). Once successfully attached, the Cloud Manager/SHO 20 sends a request 214 for the management domain 26 to install, configure and start the vM2ME (binding the specific instance of the CM 25 and subscriber's MCIM with the VM). This also involves transferring the VM software. At step 215 the management domain 26 operating system starts the vM2ME, and sends a reply 216 to confirm when it is running. The result of the whole operation is then communicated to the subscriber/requestor (signal 217). When the VM has booted, it will communicate with the 3GPP network of the SHO via the CM, thereby indicating that the vM2ME is running.

Alternative B: MNO Provides Services in a Third Party's Cloud

This alternative provides a more generalized solution, compared with Alternative A. The MNO utilizes computing/ cloud space from a third party/foreign cloud operator. Note that the procedure is transparent to the subscriber.

Figure 3A:
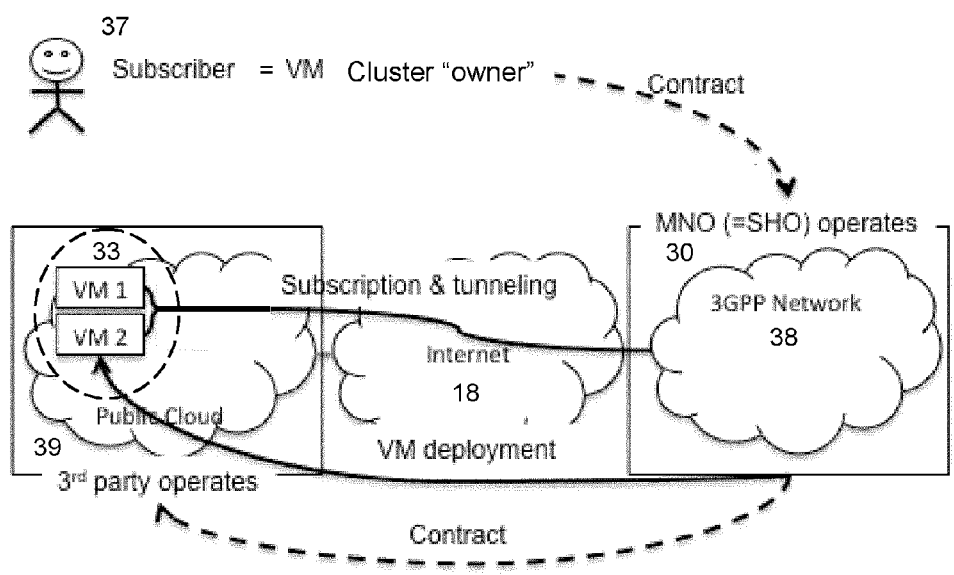
FIG. 3a is a schematic illustration showing how a vM2ME relates to the parties involved in the service level agreements in accordance with an alternative of the first embodiment.

FIG. 3a illustrates schematically how a vM2ME 33 relates to the parties involved in the service level agreements—i.e. the MNO who is the SHO 30 and operator of the 3GPP network 38, the subscriber 37, and the operator of a third party public cloud 39. The SHO 30 has a contractual agreement with the cloud operator 31 for the provision of resources for VMs. The subscriber 37 is the owner of the vM2ME 33 that comprises VMs (here two VMs are shown, but there could be any number), which provide services to users (not shown) over the Internet 18 and via the SHO's 3GPP network 38. As before the SHO 30 may provide VM services for more than one subscriber.

Figure 3B:
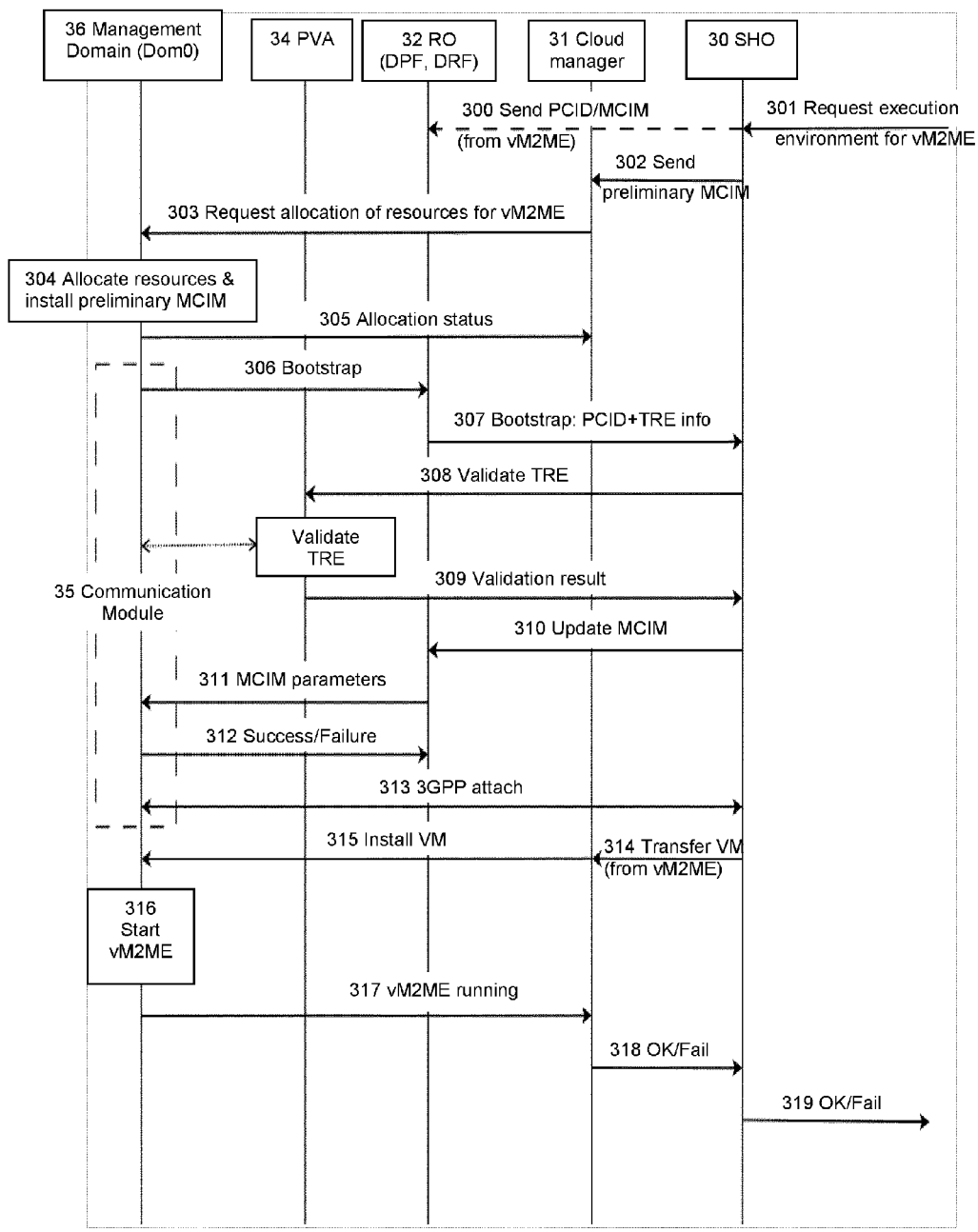

FIG. 3b is a signal diagram illustrating the procedure for provisioning the MCIM, and thereby enabling the vM2ME to start running on behalf of the subscriber for Alternative B. The entities involved include: the SHO 30, the Cloud Manager 31, who in this case is the manager of the third party cloud; an RO 32 linking to a DRF and a DPF; a PVA 34; and the management domain (Dom0) 36 of the third party cloud virtualization platform. Some of the signalling shown in FIG. 3 was omitted from FIG. 2 for Alternative A, because the Cloud Manager and SHO were shown in FIG. 2 as the same entity.

As shown in FIG. 3b, the SHO 30 registers a preliminary MCIM for the vM2ME with the RO 32, as shown at signal 300. The SHO 30 receives a request 301 to establish an execution environment for the vM2ME. There are two alternatives that affect the ordering of signals 300 and 301. In one scenario either the subscriber has been pre-provisioned with a preliminary MCIM from another source, or, if the subscriber does not yet have a preliminary MCIM, the SHO 30 allocates one and sends it to the RO 32. In these cases the order of signals is first 301, and then 300. Alternatively, the SHO 30 may have pre-provisioned preliminary MCIMs, and already registered them with the RO 32. In that case the order of the signals is first 300, then 301.

In signal 302, the SHO 30 transfers the preliminary MCIM to the cloud manager 31, together with a request to set up a vM2ME. The cloud manager 31 sends a request 303 to the management domain (Dom0 36), for resources for a new VM and also provides the preliminary MCIM to management domain 36. At step 304, management domain 36 reserves the resources, installs the preliminary MCIM credentials and installs a new instance of the CM software module 35 associated with the new preliminary MCIM. Management domain 36 then returns an allocation status signal 305 to the cloud manager 31.

The CM allocated for the VM, then starts the bootstrapping process, which proceeds with signals 306-312 in the same way as signals 206-212 described above for FIG. 2, except that the signals are directed to just the SHO 30 and not to the cloud manager 31. If signal 312 indicates a successful completion of the bootstrapping, then the CM 35, with its newly provisioned MCIM, performs network attachment 313 (e.g. 3GPP attach procedure over IP).

The SHO 30, noticing that the new MCIM has been installed and connection to the CM 35 completed successfully, transfers the subscriber's VM (signal 314) to the cloud manager 31, which, in turn, forwards this with a request 315 to management domain, 36 to install and configure the VM (bind the specific instance of CM 35 and the VM). At step 316 management domain 36 starts the vM2ME, and sends a reply 317 to the cloud manager 31 when it is running. The result of the whole bootstrapping operation is then communicated to the SHO 30 and on to the subscriber/requestor (signals 318 and 319). When the VM has booted, it will communicate with the 3GPP network of the SHO 30 via the CM 35, thereby indicating that the VM is running.

Second Embodiment

MCIM and CM are Located in a VM Domain (DomU)

In this second embodiment it is assumed that the mobile operator does not control the management domain (Dom0) of the virtualization platform. Instead, the mobile operator has a virtual management domain running in a virtual machine (domU) which is run in another cloud operator's cloud. The methods described below explain how a vM2ME (VM/service+MCIM) can be deployed remotely (e.g. from the internet) in cases where the cloud system is not operated and/or owned by the mobile operator (i.e. the provider of MCIM). Again there are two alternative solutions described. In the first alternative, the MNO runs its own VM/guest operating system in a third party's cloud, while the subscriber's VM (or vM2ME) is installed in the same third party cloud. In the second alternative, there is no separate subscriber's VM, but instead the MNO runs applications in its VM on behalf of the subscriber as part of a certified service.

Alternative A—Deploying Subscriber's VM using MNO-VM

In this solution the SHO has deployed a VM (MNO-VM) which acts as a special management interface. The management interface consists of a set of applications (e.g. 3GPP communication modules, remote configuration tools etc.), and is run in the MNO-VM in a third party's cloud. Due to the management interface being run as a guest operating system (DomU), it cannot directly control resources on the virtualization platform. The host operating system (i.e. Dom0/management interface) is operated by a (different) third party and so all the virtual machines that are deployed by the SHO's network, must be coordinated by the MNO-VM.

Figure 4A:
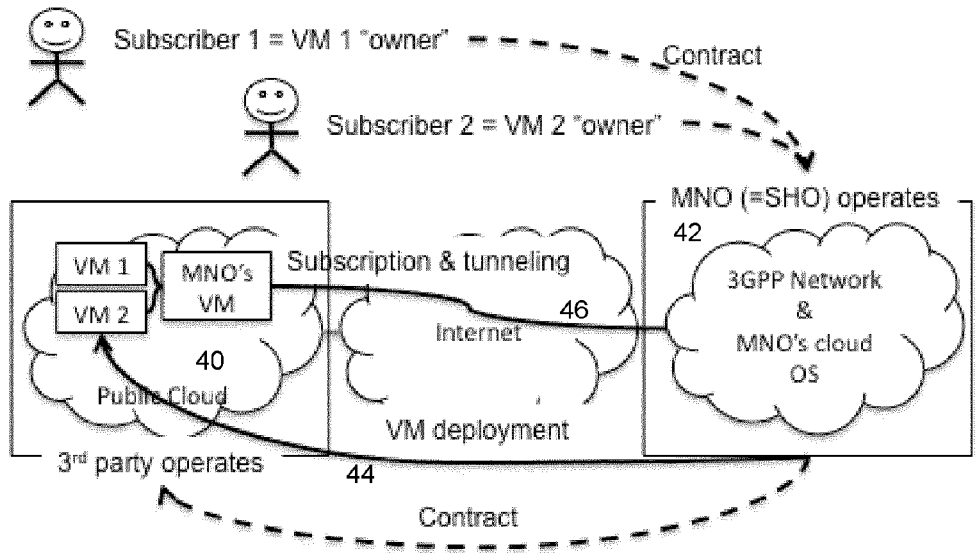
FIG. 4a is a schematic illustration showing how a vM2ME relates to the parties involved in the service level agreements in accordance with a first alternative (Alternative A) of a second embodiment.

FIG. 4a illustrates schematically how the VMs relate to the parties involved for the scenario where there are two VMs, VM1 and VM2, owned by two subscribers, Subscriber 1 and Subscriber 2. VM1 and VM2 are running in the third party's public cloud 40. To simplify the description, the MNO 42 is operating as SHO for the subscribers (although this need not be the case and there could be a separate SHO and MNO with a contractual arrangement between them). The MNO 42 does not have administrative access to the third party's Cloud OS or management domain (Dom0). Therefore, the MNO 42 runs its own guest domain (DomU) in the public cloud 40 for the MCIMs and CMs in order to serve its customers' (Subscribers 1 and 2) VMs. In FIG. 4a, the dashed lines illustrate the contractual relationships between the parties, while the solid line 44 indicates the deployment of the VMs and solid line 46 indicates the signal path for subscriptions and communications between the 3GPP MNO/SHO 42 and the VMs.

Figure 4B:
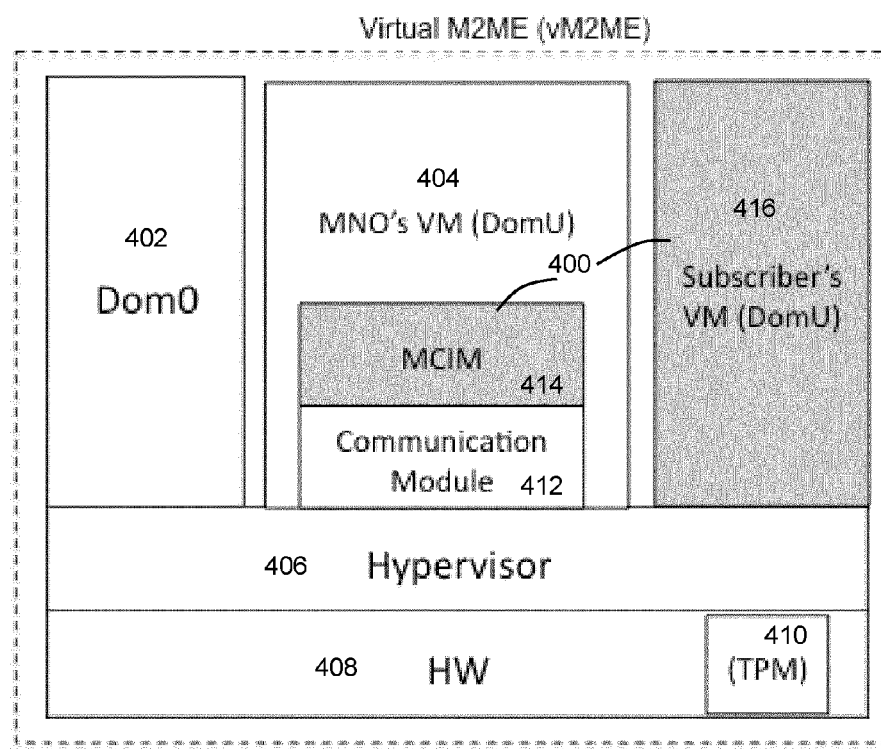
FIG. 4b shows a conceptual layered structure of a Alternative A of a second embodiment with a virtualisation platform on which is installed a vM2ME.

FIG. 4b shows the conceptual layered structure for this embodiment. As with the first embodiment shown in FIG. 1b, the vM2ME 400 is built on a TRE defined around the management domain (dom0) 402, the MNO-VM 404 and the hypervisor 406 residing on hardware 408. In this case the TRE is provided by the hypervisor isolation mechanism, although a TPM 410 and secure boot-loader (not shown) are optional.

The TRE is validated by an external authority. FIG. 4b also illustrates a CM 412 installed for execution in the domain of the MNO-VM 404 (domU) together with a MCIM 414 and associated Subscriber's VM 416 in another virtual domain (domU). The vM2ME 400 runs the subscriber's (untrustworthy) VM 416.

Figure 5:
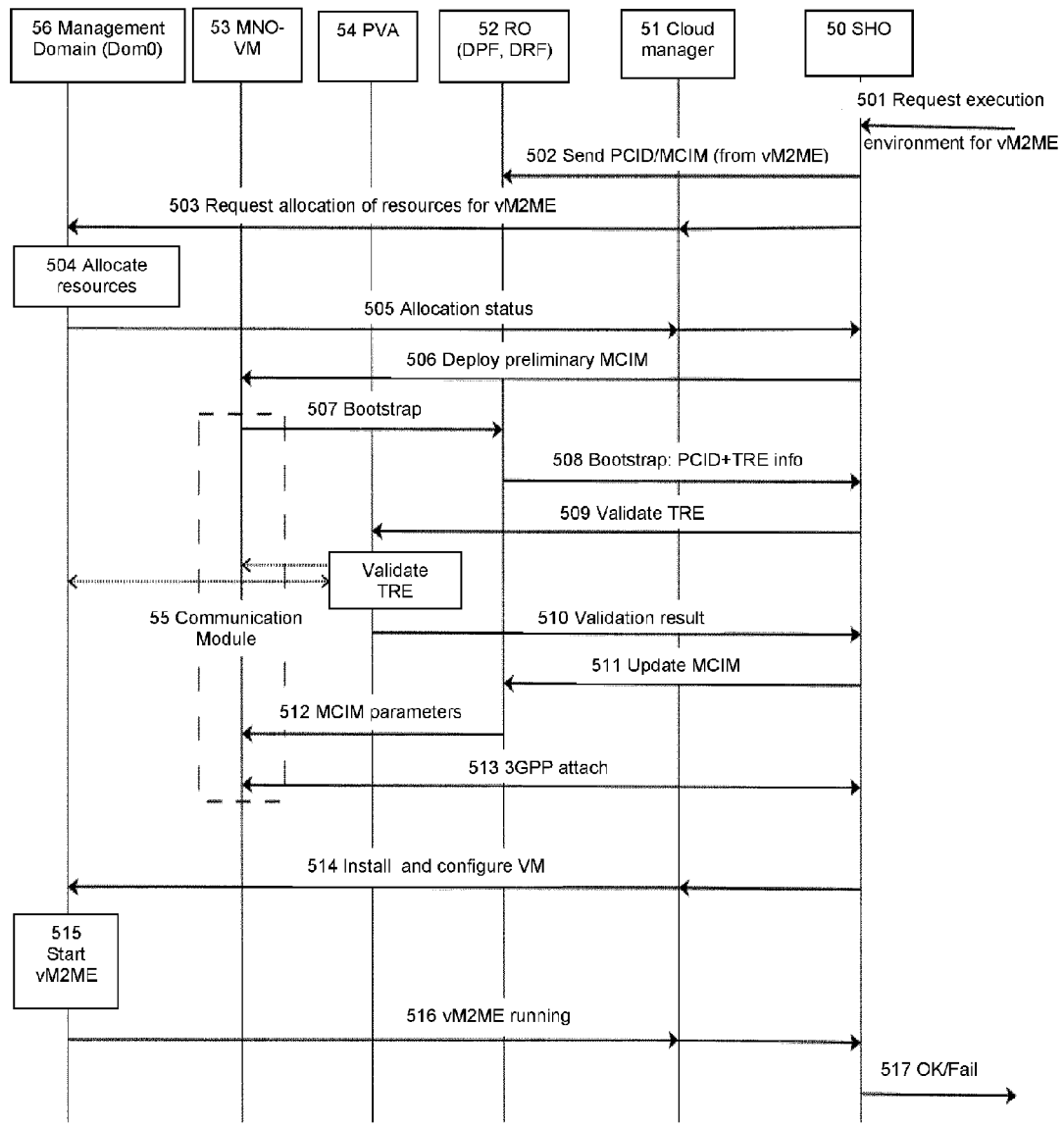
FIG. 5 is a signal diagram illustrating the procedure for provisioning an MCIM for Alternative A of the second embodiment according to FIGS. 4a and 4b.

FIG. 5 is a signal diagram illustrating the procedure for provisioning the MCIM, and thereby enabling the subscriber's VM to start running in the third party cloud 40. The entities involved include: the SHO 50, a Cloud Manager 51, who in this case is the manager of the third party cloud; an RO 52 linking to a DRF and a DPF; a PVA 54; the MNO-VM 53; and the management domain (Dom0) 56 of the third party cloud virtualization platform.

A request 501 to establish an execution environment for a vM2ME is received from a subscriber in the SHO 50. The subscriber wants to run his VM (with MCIM provided by the SHO 50) so that it is logically hosted in the SHO's network, although actually in the third party cloud. As described above for the first embodiment, the SHO registers a preliminary MCIM via the RO 52 (signal 502), and instructs the cloud manager 51 to proceed (not shown as a separate signal in the figure). Note that the cloud manager 51 may be operated by a third party provider. The SHO 50 sends a request 503 via the cloud manager 51, either directly to the management domain (Dom0) 56 of a selected virtualization platform as depicted in FIG. 5, or indirectly via the MNO-VM 53. The management domain (dom0) 56 then allocates resources (disk/ram) for the subscriber's VM at step 504 and returns the allocation status 505 to the cloud manager 51. If negative, the process ends (i.e. skips to step 517), but if positive (as shown in FIG. 5) the status signal 505 is forwarded to the SHO 50, which then sends a preliminary MCIM (of the subscriber) in signal 506 to the MNO-VM 53. This signal 506 triggers the allocation of a new instance of a CM 55 to service the new subscriber, as well as bootstrapping the 3G credentials from the preliminary MCIM with signals 507 to 512, which are essentially the same as signals 206-211 or 306-311 in FIGS. 2 and 3 and described above for the first embodiment, except that the CM 55 is now in the MNO-VM (DomU) instead of management domain (Dom0). Briefly: a bootstrap request 507 is sent to the RO 52 and forwarded 508 with the PCID and TRE information to the SHO; the SHO sends a request 509 for the PVA 54 to validate the state of the virtualization platform. The PVA 54 validates both the MNO-VM 53, and the underlying virtualization platform, and returns the result 510 to the SHO 50.

If the validation was successful, the SHO 50 uploads (signal 511) the subscriber MCIM to the RO 52. This causes the RO 52 to be able to complete the bootstrapping request (508), and send the final MCIM to the MNO-VM 53 in signal 512. The newly created instance of CM 55 in the MNO-VM 53, then installs the subscriber MCIM, and attaches 513 to the 3GPP network (over the internet).

Once the SHO 50 notices that the CM 55 has attached to the network, it transfers the subscriber's VM to the virtualization platform (represented here by the management domain (Dom0) 56) of the third party cloud although the VM itself will be installed in domain (DomU) of the virtualzation platform. To achieve this, the SHO 50 sends the signal 514 via the cloud manager 51 to the management domain 56. The actual control message between the cloud manager 51 and the virtualization platform may contain extra signaling information internal to the cloud system. The management domain 56 starts the VM at step 515, and configures the network traffic to travel via the MNO-VM 53. The result of the successful installation is sent in a return signal 516 to the cloud manager 51, and forwarded to the SHO 50. Finally, the result 517 is sent to the original requester.

Alternative B—Deploying an Application/Service using MNO-VM

The difference between Alternatives A and B of this embodiment, is that in A the subscriber wants to run a VM, whereas in B the subscriber only wishes to run an application/service, and this is done using the MNO-VM. Since no new resources need to be allocated from the virtualization platform the steps of communicating with the platform can be omitted. This means that resources can be saved (potentially leading to lower costs). However, the subscriber's service must be validated thoroughly. Running a malicious service within a MNO-VM could cause problems for other subscribers and for the 3G network itself. Therefore, the applications/services that could be deployed using this solution would likely be developed by the 3G network operator or their certified partners. Technically, alternative B is very similar to alternative A, but instead of allocating resources for a subscriber's VM, the MNO-VM just sets up a container (e.g. FreeBSDjail) as described further below, and runs the subscriber's application(s) there. The Cloud manager is not involved in the communications.

Figure 6A:
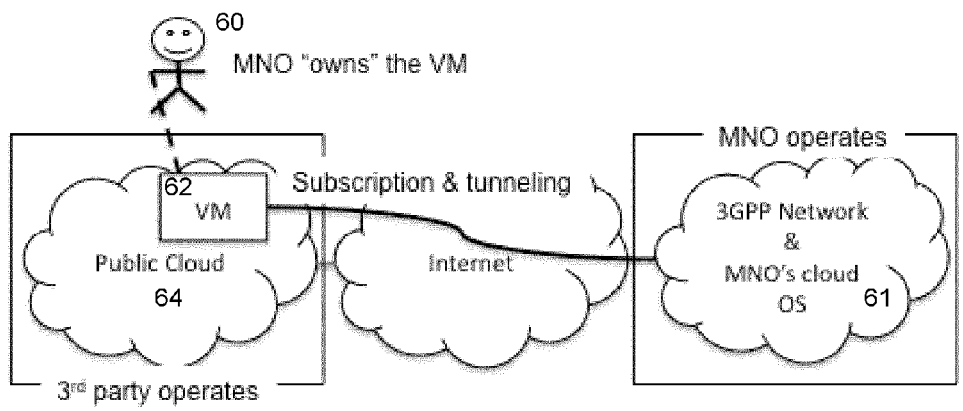
FIG. 6a is a schematic illustration showing how a vM2ME relates to the parties involved in the service level agreements in accordance with a second alternative (Alternative B) of a second embodiment.

FIG. 6a illustrates schematically how a vM2ME relates to the parties involved in the service level agreements for this alternative B. An MNO 60 is the operator of a 3GPP network 61, and provides services from a VM 62 that it owns but runs in a third party's cloud 64. The MNO 60 does not have administrative access to the Cloud OS or management domain in the public cloud 64. The VM 62 is trusted from the viewpoint of the MNO 60. The MNO 60 can then run its customers' (subscribers') applications/services in the VM 62.

Figure 6B:
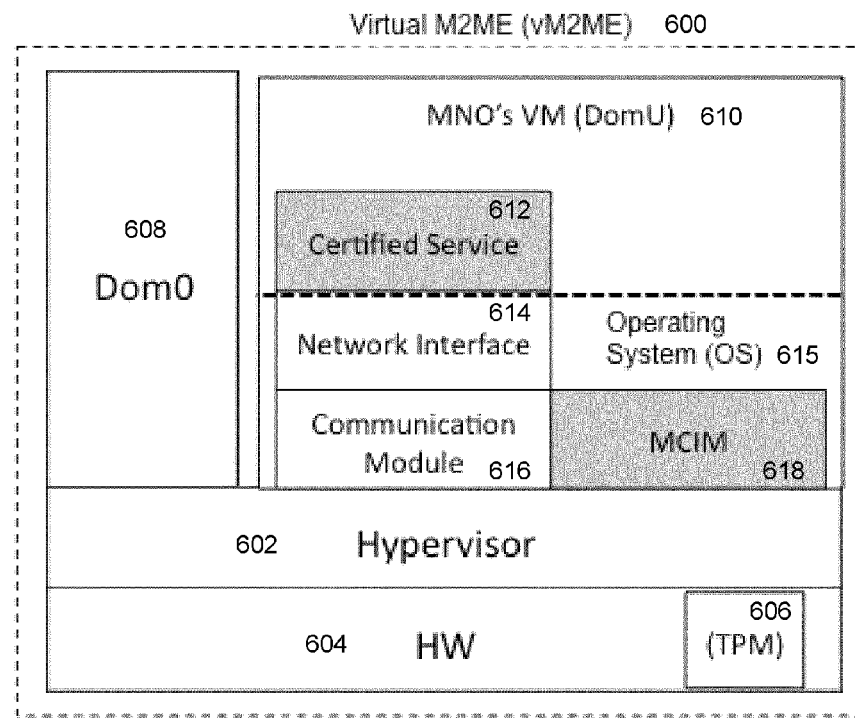
FIG. 6b shows a conceptual layered structure of a Alternative B of the second embodiment with a virtualisation platform on which is installed a vM2ME.

FIG. 6b illustrates the vM2ME 600 of this alternative B using the layered concept as previously described. In this case a VMM or hypervisor 602 of a third party's cloud platform resides on hardware 604. As with alternative A, there is a TRE which is optionally based on a TPM 606. The hypervisor 602 supports a management domain (dom0) 608 of the virtualization platform, as well as the MNO's VM 610 (in a domU). The MNO's VM 610 includes a certified service (or application) 612, a network interface 614, and an operating system (OS) 615 as well as one or more CM 616 and associated MCIM 618.

Figure 7:
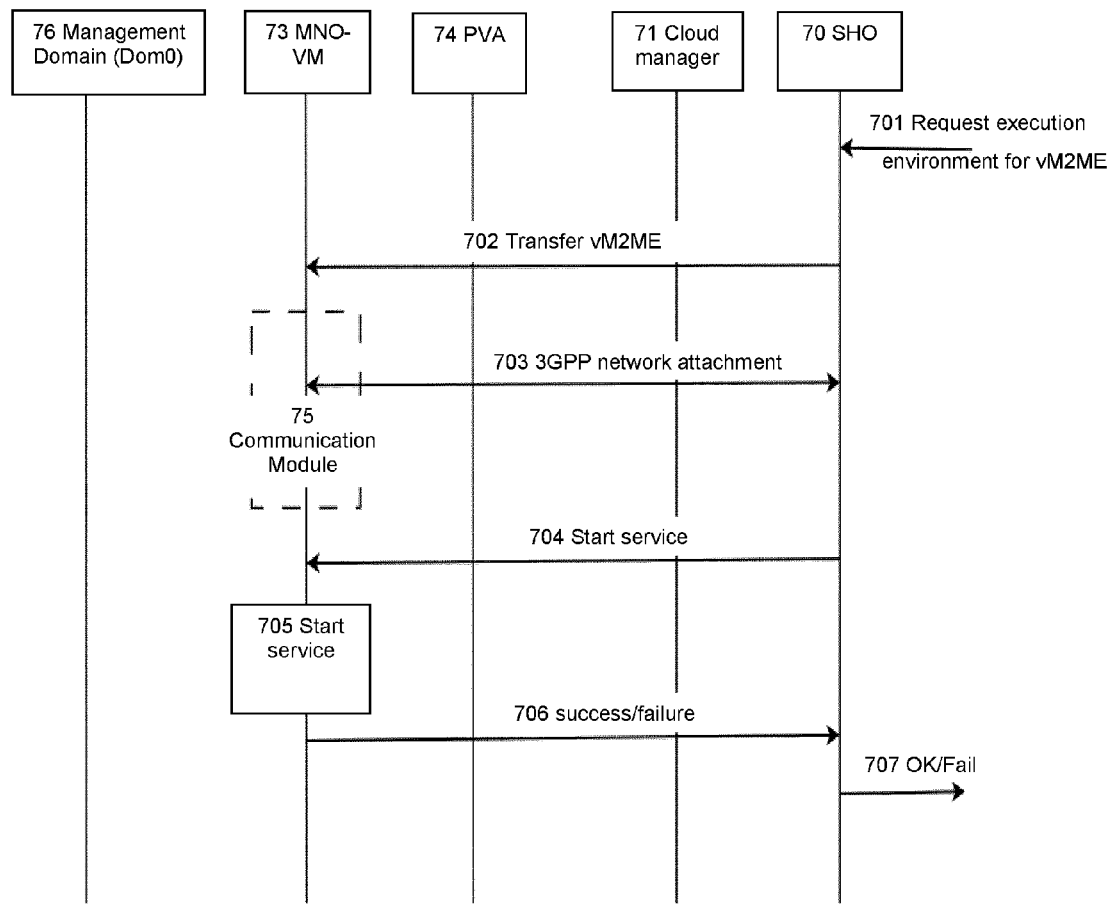
FIG. 7 is a signal diagram illustrating the procedure for provisioning an MCIM for Alternative B of the second embodiment according to FIGS. 6a and 6b.

FIG. 7 is a signal diagram illustrating the procedure for provisioning the MCIM for Alternative B of this second embodiment. The entities involved include: the SHO 70, a Cloud Manager 71 of the third party cloud; the MNO-VM 73; and the management domain (Dom0) 56 of the third party cloud/virtualization platform. The cloud manager 71 and management domain 76 are shown, but not involved in the MCIM provisioning signaling.

A request 701 for provision of VM services is received from a requester (e.g. the subscriber or authorized agent of the subscriber). The subscriber wants to run his VM applications/services (using an MCIM for the subscriber provided by the SHO 70) such that these are logically hosted in the SHO's network, although actually executed in the third party cloud. Request 701 preferably includes detailed requirements (such as, expected CPU utilization, disk space and networking requirements etc.), otherwise the SHO 70 will need to obtain any such information that it requires—e.g. by requesting it from the subscriber. By way of signal 702, the SHO 70 transfers the vM2ME to the MNO-VM 73. Note that here the vM2ME comprises the subscriber's application/service program (either in source code, which is later compiled to produce executable binary, or directly in executable binary) and the MCIM.

Although not shown in FIG. 7, the MNO-VM may utilize an operating system level virtualization technique, such as FreeBSD's jails or Linux containers (LXC) to create a separate service container for the subscriber's service. Such containers are often used for Operating System-level virtualization where the kernel of an operating system allows for multiple isolated user-space instances (often called containers, or jails), instead of just one. In addition to isolation mechanisms, the kernel often provides resource management features to limit the impact of one container's activities on the other containers. However, it is not a requirement of this embodiment alternative for there to be operating system level virtualization. The main purpose of the container is to protect against subscribers intercepting (or 'sniffing') each others traffic and/or files. This isolation may be implemented in other ways, such as with a dynamic linker or mandatory access control.

A new instance of a CM 75 is installed in the MNO-VM 73, within the service container (if created). The newly created instance of the CM 75 in the MNO-VM 73 installs the MCIM, and at step 703 performs 3GPP network attachment (over the internet). If used, the service container's network access is restricted until a successful 3GPP network attachment has been accomplished.

Once the CM 75 has successfully attached to the network, the SHO 70 sends a request 704 to the MNO-VM 73 to start the subscriber's service. At step 705, the MNO-VM 73 prepares the subscriber's application/service for execution, configures network connectivity for the service, and starts the service. This may include first compiling the application/service (if the subscriber provided source code instead of executable code). The result is returned to the SHO 70 in the form of a success/failure indication 706, and this is relayed to the original requester in signal 707.

The first and second embodiments (and their alternatives) described above present what is seen as the most likely scenario for the deployment of a vM2ME where the CM+MCIM is installed in either a management domain (dom0) or VM (domU) of a virtualization platform (cloud) that is operated by the SHO or by a third party. It will be appreciated that other scenarios are possible, such as where the CM+MCIM are installed on a VM (domU) in a third party's cloud. However, the same principles as used in the described embodiments would still apply for the provisioning of the MCIM.

Third Embodiment

MCIM and CM are Located in a Physical Network Interface Card (pNIC)

In this embodiment, an embedded MCIM application resides on the physical network interface card (pNIC). The embodiment described is based on Peripheral Component Interconnect Express® (PCIe) Single Root I/O Virtualization and Sharing (SR-IOV), or PCIe SR-IOV-capable NICs, although programmable NICs also make it possible to implement such functionality.

An SR-IOV-capable device can be configured by the Virtual Machine Manager (VMM) to appear as multiple functions, each with its own configuration space complete with Base Address Registers (BARs). The VMM assigns one or more Virtual Functions (VFs) to a VM by mapping the actual configuration space of the VFs to the configuration space presented to the VM by the VMM.

The following are some important SR-IOV related terms for understanding this embodiment:
  System Image (SI), which is equivalent to a Virtual Machine (VM).
  Single Root PCI® Configuration Manager (SR-PCIM or PCIM), which is responsible for configuration and management of the VFs and is software that is incorporated into the virtualization platform as a part of, or addition to the VMM.
  Physical Function (PF) is a PCIe® Function (per the PCI Express Base Specification) that supports the SR-IOV capability and is accessible to an SR-PCIM, or an SI".
  Virtual Function (VF) is associated with a Physical Function and shares one or more physical resources, such as a Link, with the Physical Function and other VFs that are associated with the same PF. A VF is a "lightweight" PCIe® Function that is directly accessible by an SI, and corresponds to a virtual NIC.

The pNIC is PCIe® SR-IOV-capable (or programmable). The physical resources support, inter alia, run time reconfiguration, a 3GPP communication stack, an embedded SIM (MCIM). The pNIC has N logically separated trusted execution environments implemented as SR-IOV virtual functions (VFs) or similar modules.

Figure 8A:
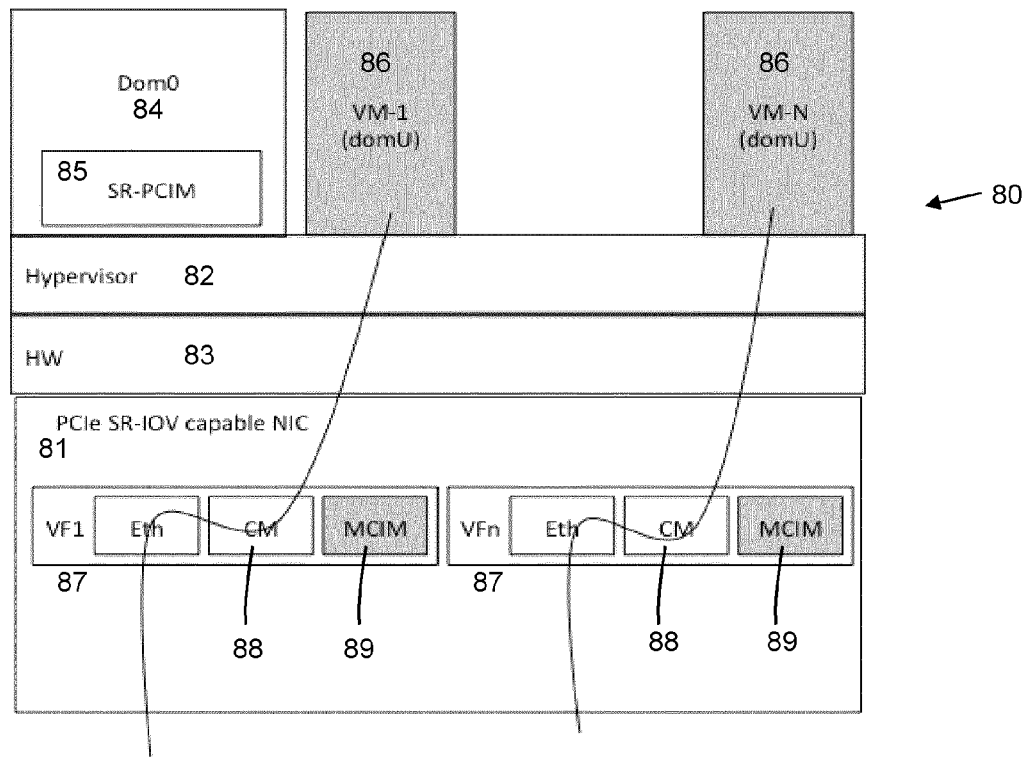
FIG. 8a shows a conceptual layered structure of a vM2ME for a first alternative (Alternative A) of a third embodiment.
Figure 8B:
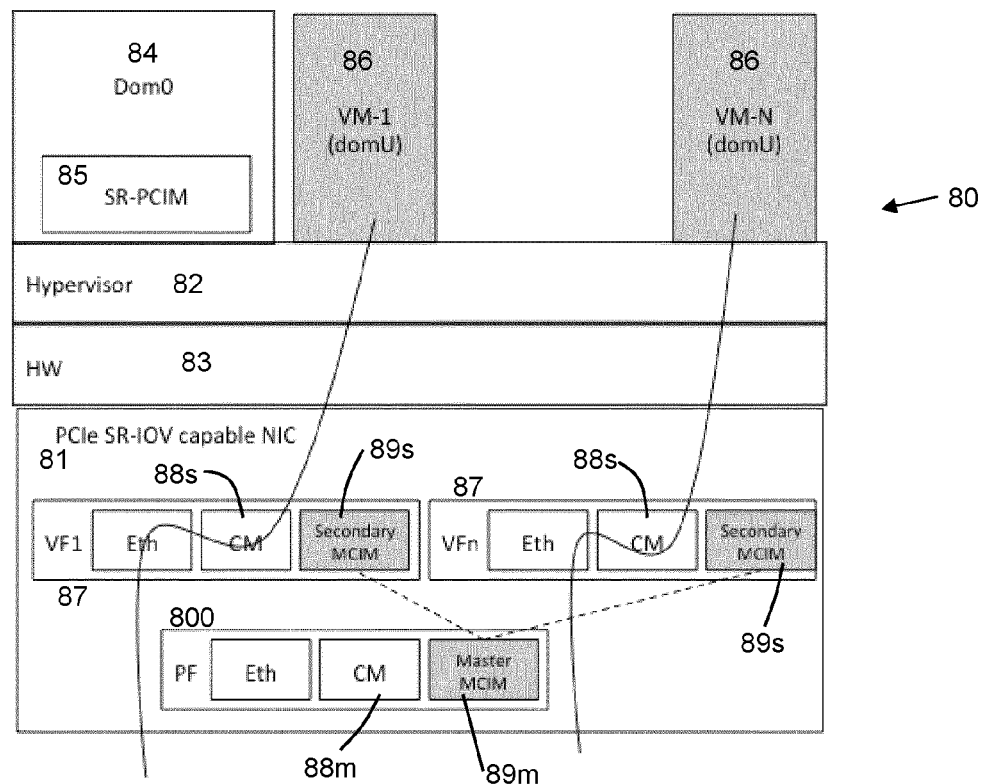
FIG. 8b shows a conceptual layered structure of a virtualisation platform on which is installed a vM2ME for a second alternative (Alternative B) of a third embodiment.

The conceptual structure of the virtual Machine-to-Machine Equipment (vM2ME) 80 for this embodiment is shown in FIGS. 8a and 8b, for each of two alternative implementations of this third embodiment. Both alternatives include the PCIe SR-IOV-capable NIC 81 as well as a VMM/hypervisor 82 residing on hardware 83, and a management domain, Dom0 84, in which the SR-PCIM 85 is installed. One or more VMs 86 in virtualization domains (DomUs) are also supported by the hypervisor 82.

In FIG. 8a the pNIC 81 has N execution environments (VFs) 87 (two are shown), each running a CM instance 88 together with an associated MCIM 89, and each associated with a VM 86. The MCIMs 89 are stored on the secure storage area, which (as shown) may reside in the same secure execution environment as the CM. The MCIMs may also reside in a trusted software component such as a Trusted Platform Module (TPM—not shown), located on the physical machine, or on the pNIC 81 itself.

In FIG. 8b, where the same reference numerals as used in FIG. 8a are used for the equivalent features, the pNIC 81 has a special execution environment/UICC (PF) 800 for a master/primary MCIM 89*m* coupled with an appropriate CM 88*m*, and a separate secondary MCIM 89*s* associated with each VM 86. When a VM 86 is deployed, the master MCIM 89*m* is used to bootstrap the secondary MCIM 89*s* of the VM 86. In this alternative 4b, the secondary MCIMs 89*s* do not need a provisioning capability as the master MCIM 89*m* creates a secure channel over which the secondary MCIMs 89*s* are downloaded and stored on the pNIC 81 in their own execution environments. This alternative is suitable for applications that provide a MNO's own services or specialized customer services that are inherently trusted by the MNO.

Figure 9:
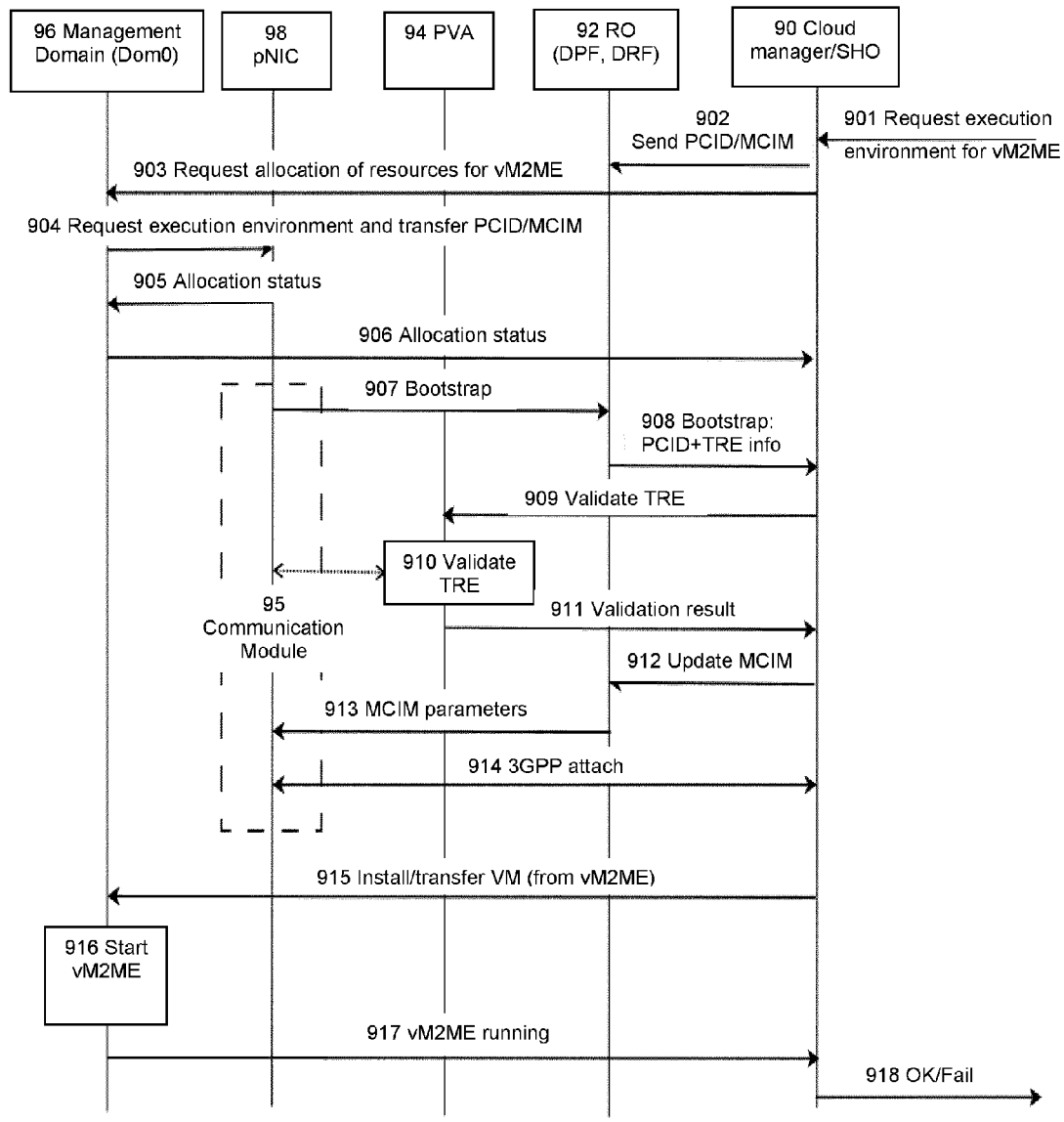

The signaling steps in the procedure of installing the MCIM 89 are shown in FIG. 9. This is based on the alternative shown in FIG. 8a. The entities involved include: the Cloud Manager/SHO 90; an RO 92 linking to a DRF and a DPF; a PVA 94; the management domain (Dom0) 96 of the cloud/virtualization platform; and the pNIC 98.

A Subscriber/Operator (not shown) sends a request 901 to the cloud manager/SHO 90 to deploy the subscriber's vM2ME. The SHO 90 sends a preliminary MCIM/PCID information to the RO (DRF) at step 902 for registration/ authorization of provisioning as described in the first and second embodiments above. The cloud manager/SHO 90 sends a request 903 to the management domain 96 for resources for the subscriber's vM2ME together with the preliminary MCIM. The management domain 96 sends a query 904 to the pNIC 98 to provide a free execution environment for a CM 95 and MCIM on the pNIC hardware. Upon allocating an execution environment, the pNIC 98 sets up the CM 95 to run in that execution environment. The CM 95 will use the preliminary MCIM to set up 3G provisioning. The pNIC 98 returns an allocation status 905 to the management domain 96, which then sends a notification 906 to the cloud manager/SHO 90 to indicate that the CM 95 and MCIM have been setup, and that there is enough disk space/RAM to host the subscriber's VM.

At step 907, the CM 95 on the pNIC 98, independently of the actual virtualization platform host, initiates 3GPP M2M bootstrapping. At step 908, the RO 92 sends a bootstrap request message to the SHO 90, together with information regarding the Trusted Environment (TRE) so that the SHO 90 can start the procedure to have the TRE validated. The SHO sends a validation request 909 to the PVA 94, which, at step 910, carries out the checks required to validate the state of the TRE. Once the state is verified, the validation result 911 is returned to the SHO 90. With a positive result, at step 912 the SHO 90 updates the RO 92 with the final MCIM for the subscriber. The RO(DPF) 92 sends the updated subscriber's MCIM to the CM 95 at step 913. The CM 95 in the pNIC 98 then performs a 3GPP network attachment procedure, 914, which signals the SHO 90 that the bootstrapping and validation procedures have been successfully completed. At step 915, the cloud manager/SHO 90 then sends the subscriber's VM software to the management domain 96 of the virtualization platform.

At step 916, the management domain 96 binds the VM with the execution environment in the pNIC 98 allocated to the subscriber, and starts the VM. At step 917 it notifies the cloud manager/SHO 90, and a notification of success (or failure) 918 is returned to the originator of the request 901.

For the alternative shown in FIG. 8*b*, the signal flow is the same as shown in FIG. 9, except that the CM 95 that performs bootstrapping is the CM that is configured with the master MCIM 89*m* rather than the CM configured with the subscriber's MCIM 89*s*.

The invention claimed is:

1. A method of providing a subscriber identity for the provision of services on behalf of the subscriber in a virtual computing environment, the method comprising:
   receiving a request to establish an execution environment for a virtual machine-to-machine equipment (vM2ME);
   providing the vM2ME comprising software for execution in the virtual computing environment and a Machine Communication Identity Module (MCIM);
   setting up a Communications Module (CM) for execution in a domain of a virtualization platform, the CM providing an end-point for communications between the vM2ME and a 3GPP network; and
   installing the MCIM for execution together with the CM, the MCIM including a 3GPP identity of the subscriber, security data and functions for enabling access to the vM2ME via the 3GPP network.

2. The method of claim 1, wherein setting up the CM comprises:
   providing a preliminary, MCIM;
   performing a bootstrapping procedure based on identities and security information provided in the preliminary MCIM; and
   upon successfully completing the bootstrapping procedure, providing a subscriber MCIM that includes the 3GPP identity of the subscriber, security data and functions for enabling access to the vM2ME via the 3GPP network.

3. The method of claim 2, further comprising sending a request for allocation of resources for the vM2ME to a management domain of the virtualization platform, and in response to a confirmation of allocation of the resources, providing the preliminary MCIM to an allocated domain or location of the virtualization platform for performing the bootstrapping procedure to set up the CM for execution in the allocated domain or location.

4. The method of claim 3, wherein the allocated domain or location in which the CM is set up for execution is the management domain of the virtualization platform.

5. The method of claim 3, wherein the 3GPP network is associated with a mobile network operator, and wherein the allocated domain or location in which the CM is set up for execution is a domain of the virtualization platform that comprises a virtual machine operated by the mobile network operator.

6. The method of claim 3, wherein the allocated domain or location in which the CM is set up for execution is a physical network interface card (pNIC) that interfaces with a virtual machine manager (VMM) of the virtualization platform.

7. The method of claim 2, further comprising obtaining authorizations from a registration function and a provisioning function, to authenticate the preliminary MCIM and to authorize provisioning of the MCIM for the subscriber.

8. The method of claim 1, further comprising establishing a Trusted Environment, (TRE) that includes a virtual machine manager (VMM) and a management domain of the virtualization platform together with the CM and the MCIM installed for the subscriber.

9. The method of claim 8, further comprising validating the TRE using an external validation authority.

10. A 3GPP network entity configured to provide a subscriber identity for the provision of services on behalf of the subscriber in a virtual computing environment the network entity being configured:
    on receiving a request to establish an execution environment for virtual machine-to-machine equipment (vM2ME) to provide the vM2ME that comprises a virtual machine (VM) software for execution in the virtual computing environment and a Machine Communication Identity Module (MCIM);
    to set up a Communications Module (CM) for execution in a virtualization platform, the CM providing an end-point for 3GPP communications to and from the VM; and
    to install the MCIM for execution together with the CM, the MCIM including a 3GPP identity of the subscriber, security data and functions for enabling access to the vM2ME via the 3GPP network.

11. The 3GPP network entity of claim 10, further configured to:
    provide a preliminary MCIM and to cause a bootstrapping procedure to be carried out based on identities and security information provided in the preliminary MCIM to set up the CM; and
    in response to notification of a successful completion of the bootstrapping procedure, provide the MCIM including the 3GPP identity of the subscriber, the security data and the functions for enabling access to the VM via a 3GPP network.

12. The 3GPP network entity of claim 11, further configured to send a request for allocation of resources for the vM2ME to a management domain of a virtualization platform, and in response to receiving a confirmation of allocation of the resources, to provide the preliminary MCIM to an allocated domain or location of the virtualization platform for performing the bootstrapping procedure to set up the CM in the allocated domain or location.

13. The 3GPP network entity of claim 11, configured to obtain authorizations from a registration function and a provisioning function, the authorizations authenticating the preliminary MCIM and authorizing provisioning of the MCIM for the subscriber.

14. The 3GPP network entity of claim 11, further configured to establish a Trusted Environment, (TRE) that includes a VMM and a management domain of the virtualization platform together with the CM and MCIM of the subscriber.

15. The 3GPP network entity of claim 14, further configured to initiate a validation of the TRE using an external validation authority.

16. A non-transitory computer-readable medium storing a computer program product comprising instructions that, when executed by a computer in a network, cause the computer to provide a subscriber identity for the provisioning of services from a virtual computing environment, including program instructions to cause the computer to:
in response to receiving a request to establish an execution environment for a virtual machine-to-machine equipment (VM2ME), provide the vM2ME comprising software for execution in the virtual computing environment and a Machine Communication Identity Module (MCIM);
set up a Communications Module (CM) for execution in a domain of a virtualization platform, the CM providing an end-point for communications between the vM2ME and a 3GPP network; and
install the MCIM for execution together with the CM, the MCIM including a 3GPP identity of the subscriber, security data and functions for enabling access to the vM2ME via the 3GPP network.

17. The non-transitory computer-readable medium of claim 16, wherein
the computer program product further comprises instructions configuring the computer to:
provide a preliminary MCIM;
initiate a bootstrapping procedure to be carried out based on identities and security information provided in the preliminary MCIM to set up the Communications Module (CM), and
in response to notification of a successful completion of the bootstrapping procedure, to install the MCIM for the subscriber, including the security data and the functions for enabling access to the vM2ME via the 3GPP network for execution together with the CM.

* * * * *